UNITED STATES PATENT OFFICE.

GEORG ZUELZER, OF BERLIN-CHARLOTTENBURG, GERMANY, ASSIGNOR TO CHEMISCHE FABRIK AUF ACTIEN (VORM. E. SCHERING), OF BERLIN, GERMANY.

BIOLOGICAL PREPARATION FOR THE PRODUCTION OF INTESTINAL PERISTALSIS.

1,034,856. Specification of Letters Patent. Patented Aug. 6, 1912.

No Drawing. Application filed October 22, 1909. Serial No. 524,008.

*To all whom it may concern:*

Be it known that I, GEORG ZUELZER, doctor of medicine, citizen of the Empire of Germany, residing at Berlin-Charlottenburg, Kingdom of Prussia, German Empire, have invented a new and useful Improvement in Biological Preparations for the Production of Intestinal Peristalsis, of which the following is a specification.

Modern biological investigation is endeavoring to discover ferments, or ferment-like substances which assist different biological and metabolic processes. Thus pancreas ferment or rather hormone was discovered as the agent for normal glycolysis and the production of such ferment is described in my application for patent, Serial No. 431,226, filed May 6, 1908.

According to the present invention it is possible to produce another biological phenomenon, viz: normal intestinal peristalsis, by means of a hormone or ferment-like substance derived from a suitable digestive organ containing this hormone, such as the spleen, the stomach, or the intestine. Hormones differ from ferments as now understood, in that ferments are materially changed or rendered incapable of action by boiling, while hormones are not so affected. If such an organ be removed from an animal during the process of digestion, the mucous membrane separated from the muscular tissue and the mucous membrane or even the entire triturated organ treated in a manner suitable for injection purposes, it is possible to produce in other animals by injection of the extract a regular paristalsis starting from the duodenum and extending to the rectum.

The ferment may be produced as follows: For the preparation of this hormone it is desirable to employ the spleen of an animal and the latter is preferably killed during the process of digestion. The spleen is cut into small pieces or minced and extracted by means of a physiological solution of common salt (containing 8 grams of salt per liter), or a dilute solution of muriatic acid (0.4%). The extract is then boiled, the albuminous precipitate removed by filtration, the filtrate is neutralized, preferably by means of sodium carbonate, and aseptically filtered. If physiological salt solution is employed the extract is preferably acidulated with dilute muriatic acid. Instead of extracting the minced spleen by a salt solution or dilute muriatic acid, as described, the liquid can be extracted by pressure and the juice resulting from the pressing operation and acidulated with dilute muriatic acid can be treated as described. Instead of the spleen, the stomach or the intestine can be employed by treating these parts or their mucous membranes as described, but these parts are less desirable. If the stomach is used the pepsin contained in the liquid is destroyed by the boiling. The filtrate so produced contains the desired hormone and is preferably used directly as a curative agent by injecting it into the muscles or veins. The filtrate is preferably concentrated to such an extent that the injection of one cubic centimeter produces in a rabbit a decided peristalsis. The dose for an adult is about 15–20 cubic centimeters of such a solution, administered by intravenous or intra-muscular injection.

The solution can be evaporated to dryness, preferably *in vacuo* at 35–40° C. The dry preparation is a brownish, hygroscopic powder, which is readily soluble in water, a soda solution or a dilute alkali solution, but is insoluble in alcohol. The alkaline solution gives the biuret reaction. The watery solution can be boiled without changing the efficiency of the preparation.

I claim as my invention:

1. As a new article of manufacture, the herein described biological preparation containing the hormone which produces the normal intestinal peristalsis and which is derived from the digestive organs of animals, the same being nearly free from albuminous matter, free from tannin, soluble in water, and promoting peristalsis when introduced into the animal organism by intravenous or intramuscular injection, substantially as set forth.

2. As a new article of manufacture, the herein described biological preparation suitable for the treatment of defective peristalsis, which preparation, when in a dry state, is a brownish hygroscopic powder soluble in water, soda solution and dilute alkalis, insoluble in alcohol, and which, when introduced into the organism, for instance, by intravenous or intramuscular injection, promotes peristalsis, substantially as set forth.

3. The process of manufacturing the herein described biological preparation which consists in producing from suitable digestive organs of an animal a neutral liquid which contains the hormone which produces the normal intestinal peristalsis, boiling the liquid, removing the precipitate and filtering such neutral liquid aseptically, substantially as set forth.

4. The process of manufacturing the herein described biological preparation which consists in mincing a suitable digestive organ of an animal, extracting therefrom the hormone which produces the normal intestinal peristalsis by a watery extractive solution, acidulating and boiling the extract, separating the precipitate from the liquid by filtration, neutralizing the filtrate, and filtering aseptically, substantially as set forth.

In testimony whereof I have hereunto set my signature in the presence of two subscribing witnesses.

GEORG ZUELZER.

Witnesses:
 HENRY HASPER,
 WOLDEMAR HAUPT.